A. E. BEASON.

END GATE FOR WAGONS.

No. 11,040. Reissued Nov. 19, 1889.

Witnesses:
R. H. Orwig
M. P. Smith.

Inventor:
Albert E. Beason,
By Thomas G. Orwig, Attorney.

N. PETERS, Photo-Lithographer, Washington, D. C.

UNITED STATES PATENT OFFICE.

ALBERT E. BEASON, OF AUDUBON, IOWA.

END-GATE FOR WAGONS.

SPECIFICATION forming part of Reissued Letters Patent No. 11,040, dated November 19, 1889.

Original No. 403,241, dated May 14, 1889. Application for reissue filed October 4, 1889. Serial No. 326,035.

*To all whom it may concern:*

Be it known that I, ALBERT E. BEASON, a citizen of the United States, and a resident of Audubon, in the county of Audubon and State of Iowa, have invented an Improved End-Gate for Wagons, of which the following is a specification.

My object is to facilitate the adjustment of an end-gate that is permanently attached to a wagon-box in such a manner that it can be readily locked in a closed position, readily raised partially to let grain run out, readily placed in position to be used as a shoveling-board, and readily put on the front and top of the box to be used as a seat.

My invention consists in the construction and combination of supporting, adjusting, and locking mechanism with a wagon-box and movable end-gate, as hereinafter set forth, pointed out in my claims, and illustrated in the accompanying drawings, in which—

Figure 1:
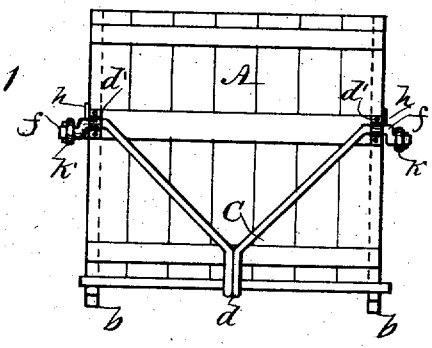
Figure 2:
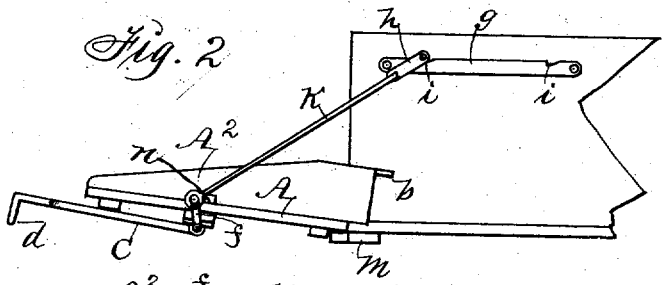
Figure 3:
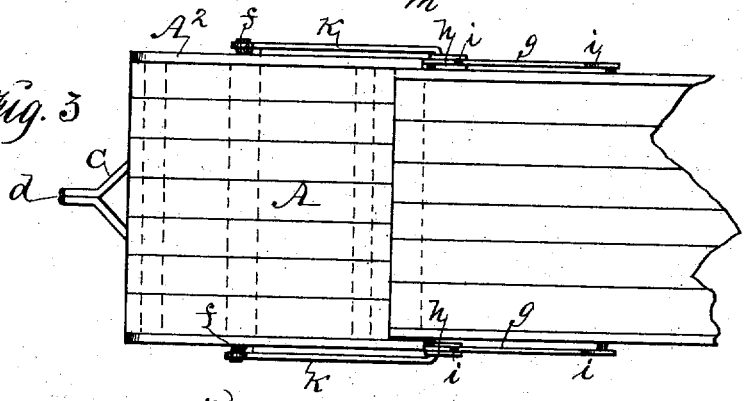
Figure 4:
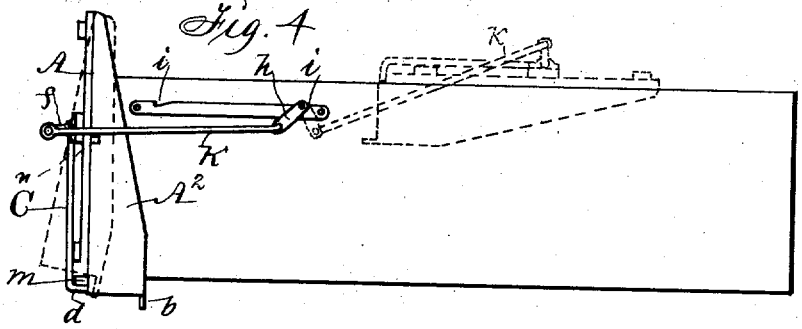

Figure 1 is a rear end view of the wagon-box, showing the gate closed and locked. Fig. 2 is a side view, and Fig. 3 a top view, showing the gate in position as required for use as a shoveling-board. Fig. 4 is a side view of the box, showing the gate closed and locked, and dotted lines indicating the position of the gate when moved forward on top of the box to be used as a seat.

A is an end-gate of common form, provided with wings $A^2$ at its ends and extensions *b* at the corners of the wings and re-enforcing cleats 1 2 3 on its back.

C is a rod doubled at its center and bent into the form of a hook *d*. The ends of the rod extend divergently, and are secured to the ends of the end-gate by means of staples or bearings *d'* in such a manner as to allow the hook to swing vertically. The ends of the rod terminate in elbows *f*, adapted to serve as cranks when the hook is operated.

*g* are bars fixed to the outside of the rear portions of the box and near the top edges of the side-boards in such a manner that loops *h*, placed on the bars, can be moved backward and forward to alternately engage shoulders *i*, produced by notches formed in the top edges of the bars.

*k* are connecting-rods that extend from the lower ends of the loops *h* to the cranks or elbows *f* on the ends of the rod C.

*m* is a cross-piece fixed to the rear end and under side of the wagon-box in a common way.

*n* are blocks fixed to the wings $A^2$ to engage the rods *k*, as shown in Fig. 2, to aid in supporting the gate when used as a shoveling-board.

To close and lock the gate, as shown in Fig. 4, the hook *d* is pressed down to engage the cross-piece *m*, and the connecting-rods *k* on the ends of the cranks *d*, and secured at their front ends to the wagon-box by means of the loops *h* and shoulders *i* of the fixed bars *g*, are drawn rearward by the downward motion of the hook as required to clamp the gate against the rear ends of the sides of the box. The rear ends of the rods are below the dead-centers of the cranks, and cannot rise to relax their binding force until the hook is disengaged from the cross-piece *m* and allowed to rise.

To discharge grain in bulk from the wagon-box, I free the hook and swing it upward and lift the gate to allow the grain to press the gate rearward until the projections *b* engage the ends of the cross-piece *m*, as indicated by dotted lines in Fig. 4, so that the grain can flow out downward.

To use the gate as a shoveling-board, I place the loops *h* in the rear notches of the bars *g* and bring the gate into a horizontal position, where it will be supported by means of the cross-piece *m*, the rods *k*, and the hook *d*, as shown in Fig. 2.

I claim as my invention—

1. A wagon end-gate having wings at its ends, a rod having a hook at its center and cranks on its diverging end portions hinged to the rear side of the gate, bars having notches in their top edges fixed to the sides of a wagon-box, and movable loops on said bars connected with cranks of the ends of the rod and hook, arranged and combined to operate in the manner set forth.

2. The rod C, having a hook *d* at its center and cranks *d* on its ends, the end-gate A, having wings $A^2$ and projections *b* at the corners of the wings, the bars *g*, having notches

*i*, the loops *h*, and the connecting-rods *k*, arranged and combined with a wagon-box having a fixed cross-piece *m*, substantially as shown and described, to operate in the manner set forth, for the purposes stated.

3. A wagon end-gate having wings $A^2$ and fixed blocks or stops *n* on the outside of said wings, the hooks *d*, having cranks *f*, and the adjustable rods *k*, arranged and combined to operate in the manner set forth.

ALBERT E. BEASON.

Witnesses:

THEO. F. MYERS,

LOUIS ROLUBECK.